US009482176B2

(12) United States Patent
Pursifull

(10) Patent No.: US 9,482,176 B2
(45) Date of Patent: Nov. 1, 2016

(54) SYSTEM AND METHOD FOR COMPENSATING GASEOUS FUEL INJECTION

(75) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1177 days.

(21) Appl. No.: 13/495,928

(22) Filed: Jun. 13, 2012

(65) Prior Publication Data

US 2013/0338903 A1    Dec. 19, 2013

(51) Int. Cl.
| | |
|---|---|
| *G06F 7/00* | (2006.01) |
| *G06F 17/00* | (2006.01) |
| *F02D 41/30* | (2006.01) |
| *F02D 19/06* | (2006.01) |
| *F02D 19/08* | (2006.01) |
| *F02D 41/00* | (2006.01) |

(52) U.S. Cl.
CPC .......... *F02D 41/3094* (2013.01); *F02D 19/061* (2013.01); *F02D 19/0628* (2013.01); *F02D 19/0642* (2013.01); *F02D 19/081* (2013.01); *F02D 41/0002* (2013.01); *F02D 41/0025* (2013.01); *F02D 41/0027* (2013.01); *F02D 19/0689* (2013.01); *F02D 19/0692* (2013.01); *F02D 2200/0414* (2013.01); *F02D 2200/0602* (2013.01); *F02D 2200/0606* (2013.01); *Y02T 10/36* (2013.01); *Y02T 10/42* (2013.01)

(58) Field of Classification Search
CPC ............. F02D 19/061; F02D 19/0268; F02D 19/0642; F02D 19/081; F02D 41/0002; F02D 41/0027
USPC ........................................................ 701/103
See application file for complete search history.

(56) References Cited

U.S. PATENT DOCUMENTS

| | | | |
|---|---|---|---|
| 5,474,054 A | 12/1995 | Povinger et al. | |
| 5,553,580 A * | 9/1996 | Ganoung | F02B 17/00 123/308 |
| 5,661,316 A | 8/1997 | Kish, Jr. et al. | |
| 5,860,407 A * | 1/1999 | Chapin | F02M 21/0239 123/527 |
| 5,937,800 A * | 8/1999 | Brown | F02B 7/06 123/27 GE |
| 5,983,714 A | 11/1999 | Izumiura et al. | |
| 6,145,494 A | 11/2000 | Klopp | |
| 6,240,910 B1 | 6/2001 | Maekawa et al. | |
| 6,401,698 B1 | 6/2002 | Yamazaki et al. | |

(Continued)

FOREIGN PATENT DOCUMENTS

| | | |
|---|---|---|
| WO | 2006018154 A1 | 2/2006 |
| WO | 2007042388 A1 | 4/2007 |
| WO | 2011114754 A1 | 9/2011 |

OTHER PUBLICATIONS

Pursifull, Ross Dykstra, "Method and System for Engine Control," U.S. Appl. No. 13/369,052, Filed Feb. 8, 2012, 31 pages.

(Continued)

*Primary Examiner* — Stephen K Cronin
*Assistant Examiner* — David Hamoui
(74) *Attorney, Agent, or Firm* — Julia Voutyras; Alleman Hall McCoy Russell & Tuttle LLP

(57) ABSTRACT

A system and method for operating an engine using gaseous fuel is described. In one example, engine operation is adjusted responsive to a temperature of air entering an engine and a resultant temperature of a gaseous fuel injected to the engine. The system and method may improve engine air-fuel control.

11 Claims, 2 Drawing Sheets

(56) References Cited

U.S. PATENT DOCUMENTS

| | | | |
|---|---|---|---|
| 6,980,902 B2 * | 12/2005 | Nakazawa | F02D 41/0002 |
| | | | 123/508 |
| 6,990,968 B2 | 1/2006 | Nagaishi et al. | |
| 7,287,521 B2 * | 10/2007 | Yang | F01N 5/02 |
| | | | 123/179.16 |
| 7,467,622 B2 | 12/2008 | Tokunaga | |
| 7,654,247 B2 * | 2/2010 | Shiraishi | F02D 31/002 |
| | | | 123/403 |
| 8,005,603 B2 * | 8/2011 | Fisher | F02D 31/002 |
| | | | 123/527 |
| 8,108,112 B2 * | 1/2012 | Thor | F02D 9/02 |
| | | | 701/104 |
| 8,631,643 B2 * | 1/2014 | Farman | F01N 3/035 |
| | | | 60/285 |
| 2012/0143480 A1 | 6/2012 | Pursifull | |
| 2013/0238226 A1 * | 9/2013 | Slaymaker | F02D 41/065 |
| | | | 701/113 |

OTHER PUBLICATIONS

Ulrey, Joseph Norman et al., "System and Method for Emptying a Tank," U.S. Appl. No. 13/431,295, Filed Mar. 27, 2012, 33 pages.

Pursifull, Ross Dykstra, "Gaseous Fuel Rail Sensor Diagnostics," U.S. Appl. No. 13/451,343, Filed Apr. 19, 2012, 25 pages.

* cited by examiner

SYSTEM AND METHOD FOR COMPENSATING GASEOUS FUEL INJECTION

FIELD

The present description relates to a method and system for operating an engine with a gaseous fuel. The system and method may be particularly useful for engines where gaseous fuel is injected into cylinder intake ports.

BACKGROUND AND SUMMARY

Vehicle engines may be operated with gaseous fuels as an alternative to liquid fuel. Alternatively, vehicle engines may be operated with a combination of liquid and/or gaseous fuels. Operating an engine with a gaseous fuel may provide owner/operator benefits in the form of lower operating costs and vehicle emissions. For example, starting an engine via combusting a gaseous fuel may reduce engine starting emissions. Further, gaseous fuels such as methane may have cost advantages over liquid fuels such as gasoline.

On the other hand, operating an engine using a gaseous fuel injector may degrade engine air-fuel control during some conditions. For example, when methane is injected into an engine intake manifold or cylinder intake port while air is being drawn into the intake manifold, gaseous fuel can cause air to be displaced from the intake manifold. If the individual amounts of air and gaseous fuel cannot be established, the engine may operate leaner or richer than is desired. Therefore, for the benefits of gaseous fuels to be fully utilized, it may be desirable to accurately determine the amounts of air and gaseous fuel entering engine cylinders.

The inventor herein has recognized the above-mentioned disadvantages and has developed a method for operating an engine, comprising: adjusting an amount of air inducted into an engine in response to output of a temperature sensor in an engine air intake; and adjusting the amount of air inducted into the engine in response to a temperature of a gaseous fuel after expansion of the gaseous fuel, the temperature of the gaseous fuel not based on the temperature sensor.

By adjusting an amount of air inducted into a cylinder responsive to a temperature sensor and a temperature of a gaseous fuel after expansion that is not based on the air temperature sensor, it may be possible to improve engine air-fuel control when an engine air amount is adjusted based on a single temperature sensor. For example, in many gaseous fuel applications, intake manifold temperature is measured at a collector area to provide an average intake manifold temperature. However, gaseous fuel is commonly injected at individual cylinder intake ports to improve transient air-fuel control. As a result, the temperature sensor located at the collector area may not provide an accurate temperature of the air-fuel mixture at the entrance to the cylinder (e.g., the cylinder inlet port). A more accurate air-fuel mixture temperature estimate may be provided by combining knowledge of the air temperature from the upstream air temperature sensor with an estimate of gaseous fuel temperature after the gaseous fuel expands in the air intake. An air-fuel mixture temperature may be determined from the individual streams of gaseous matter: air and gaseous fuel temperatures. In this way, it may be possible to provide a better estimated air-fuel mixture temperature so that the amount of air entering a cylinder may be more accurately determined.

The present description may provide several advantages. In particular, the approach may improve engine air-fuel control. Further, the approach may provide improved air-fuel control without adding system cost.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
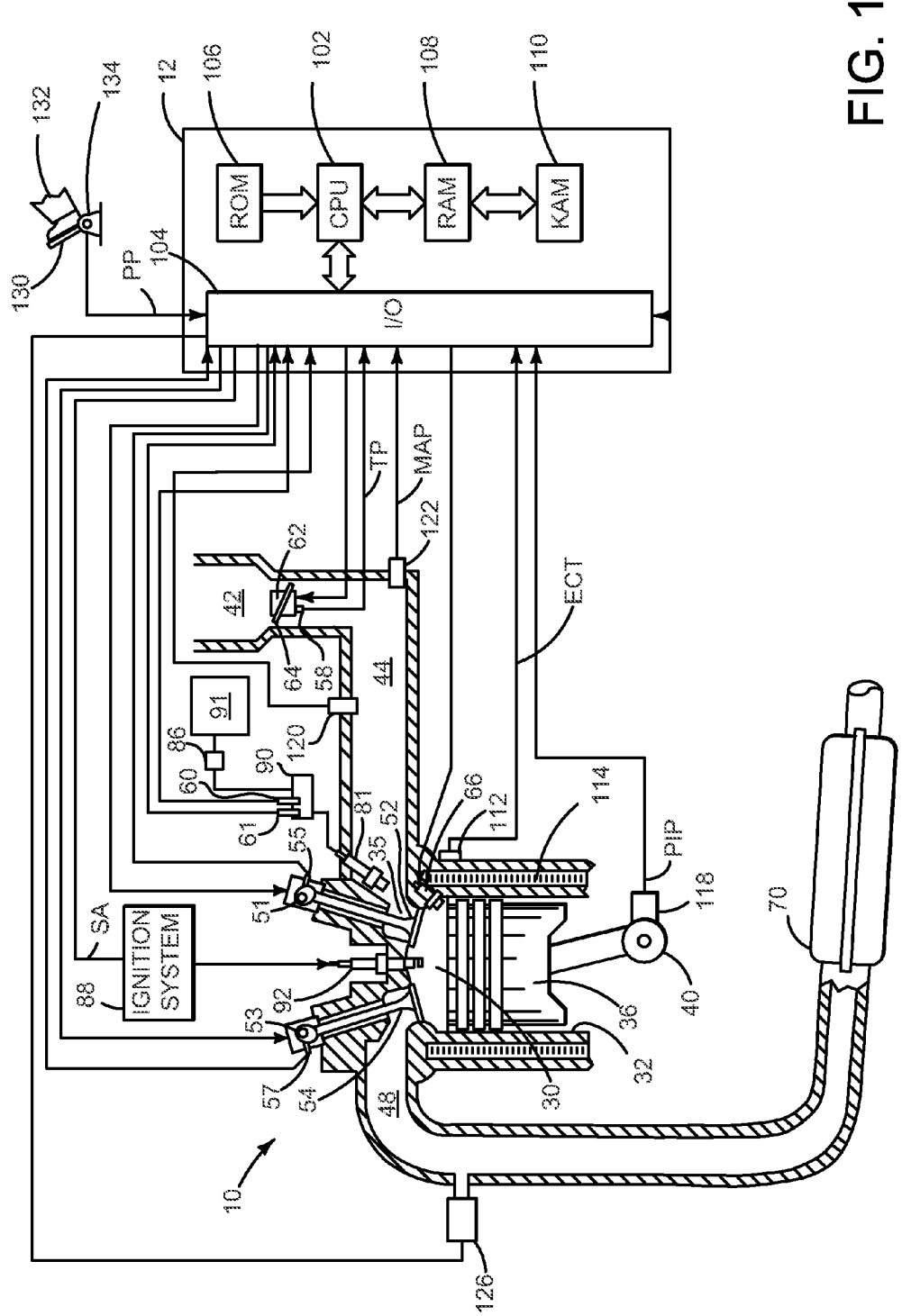
FIG. 1 is a schematic diagram of an engine.
Figure 2:
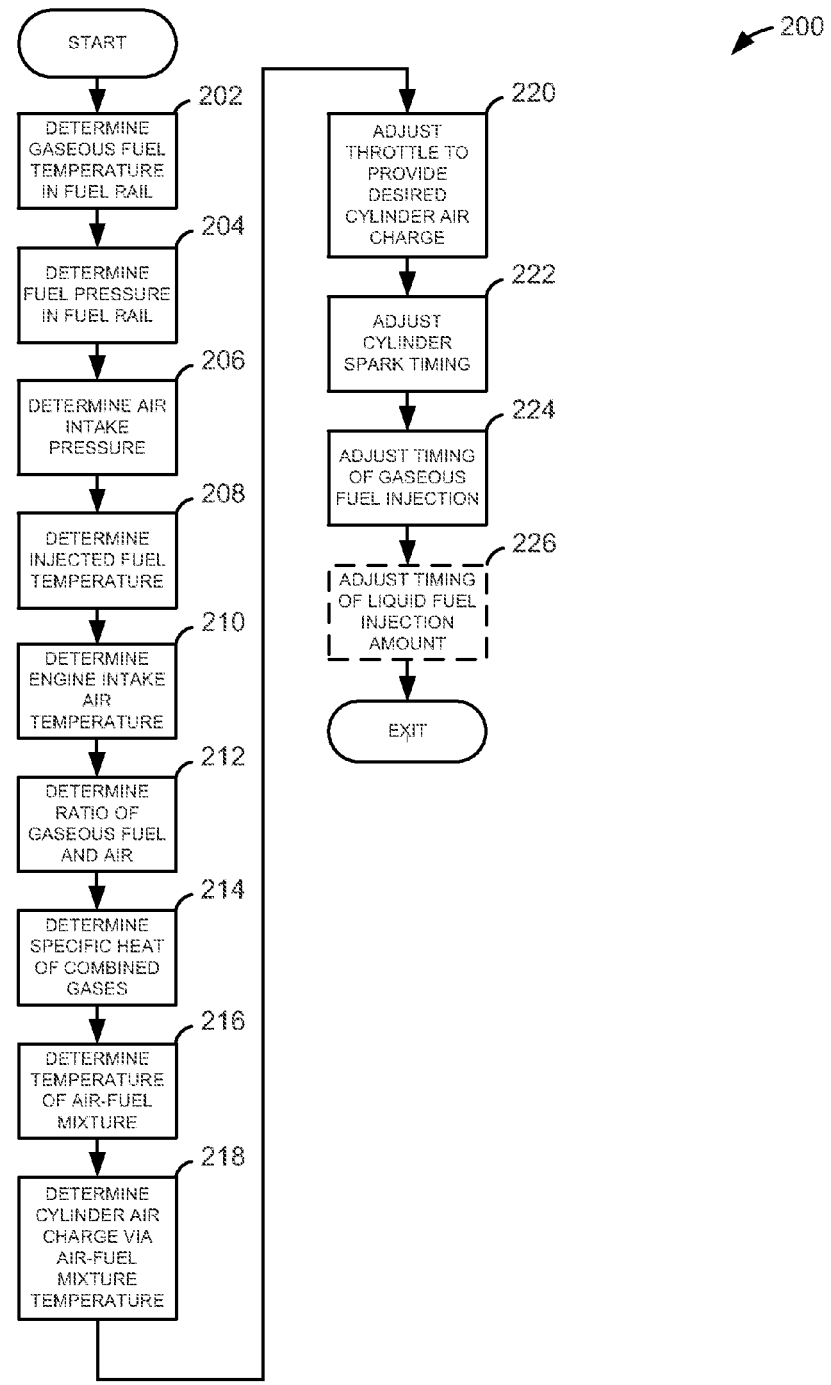
FIG. 2 is a flow chart of an example method for operating a gaseous fueled engine.

The present description is related to operating an engine with a gaseous fuel. In particular, the description provides a way to improve engine air-fuel control by improving the estimates of air and fuel entering an engine cylinder. In one non-limiting example, the engine may be in a system as shown in FIG. 1. FIG. 2 illustrates an example method for determining and adjusting cylinder air charge, spark timing, and an amount of gaseous fuel injected to an engine. In one example, a cylinder charge temperature is estimated in response to the ratio of air and fuel supplied to the engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Direct liquid fuel injector 66 is shown positioned to inject liquid fuel directly into cylinder 30, which is known to those skilled in the art as direct injection. Alternatively, liquid fuel may be injected to an intake port, which is known to those skilled in the art as port injection. Direct liquid fuel injector 66 delivers liquid fuel in proportion to the pulse width supplied from controller 12. Liquid fuel is delivered to direct liquid fuel injector 66 by a fuel system (not shown) including a fuel tank, fuel pump, and fuel rail (not shown).

Port gaseous fuel injector 81 is shown positioned to inject gaseous fuel into cylinder intake port 35. In some examples, port gaseous fuel injector 81 may be positioned in an intake port of a cylinder head. In other examples, gaseous fuel injector 81 may inject gaseous fuel into a central area of intake manifold 44. Port gaseous fuel injector 81 may provide gaseous fuel to engine 10 simultaneously with liquid fuel injector 66 supplying liquid fuel. However, gaseous fuel may be supplied solely via port gaseous fuel injector 81 in other examples.

Port gaseous fuel injector 81 receives gaseous fuel via fuel rail 90 and storage tank 91. Pressure regulator 86 controls pressure that is delivered to fuel rail 90 by storage tank 91. Temperature of gas in fuel rail 90 is sensed via temperature sensor 60. Pressure of gas in fuel rail 90 is sensed via pressure sensor 61. Opening and closing of port gaseous fuel injector 81 is controlled by controller 12 so that each delivers different gaseous fuel amounts may be delivered to combustion chamber 30.

Intake manifold 44 is shown communicating with optional electronic throttle 62 that adjusts a position of throttle plate 64 to control air flow from air intake 42 to intake manifold 44. Electronic throttle 62 is shown positioned in between intake manifold 44 and air intake 42. In some examples, intake manifold 44 and cylinder intake port 35 may be part of an air intake system.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement intake pressure from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber and/or the engine air intake including in some examples cylinder ports. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, a flowchart of a method for operating an engine is shown. The method of FIG. 2 may be executed via instructions stored in non-transitory memory of controller 12 provided by the system of FIG. 1.

At 202, method 200 determines gaseous fuel temperature in a fuel rail holding a gaseous fuel. In one example, the temperature of a gaseous fuel is measured via a temperature sensor such as temperature sensor 61 shown in FIG. 1. The temperature sensor may output a voltage, current, or pulse width. Method 200 proceeds to 204 after the gaseous fuel temperature is determined.

At 204, method 200 determines gaseous fuel pressure in the fuel rail holding the gaseous fuel. In one example, the pressure of the gaseous fuel is measured via a pressure sensor such as pressure sensor 60 shown in FIG. 1. The pressure sensor may output a voltage, current, or pulse width. Method 200 proceeds to 206 after the gaseous fuel pressure is determined.

At 206, method 200 determines pressure in the air intake system. In one example, the pressure of the air intake system is measured via a pressure sensor such as pressure sensor 122 shown in FIG. 1. The pressure sensor may output a voltage, current, or pulse width. The air intake pressure may be air pressure or pressure from a combination of air and exhaust gas. The pressure in the air intake system may also include pressure from exhaust gas recirculation (EGR) in the air intake. Method 200 proceeds to 208 after the air intake pressure is determined.

At 208, method 200 determines injected gaseous fuel temperature after expansion. In one example, injected fuel temperature is determined according to the following equation:

$$IFT = FRT \cdot \left(\frac{MAP}{FRP}\right)^{\frac{(k-1)}{k}}$$

Where IFT is injected fuel temperature, FRT is the temperature of gaseous fuel in the fuel rail, MAP is intake manifold pressure, and k is a constant with a value of 1.299. The injected fuel temperature is the temperature of the gaseous fuel after expansion in the engine air intake. Method 200 proceeds to 210 after temperature of the injected gaseous fuel is determined.

At 210, method 200 determines intake temperature. In one example, the intake temperature is determined via a temperature sensor in an intake manifold downstream of a throttle and upstream of cylinder intake ports. The temperature sensor outputs a signal indicative of intake temperature to controller 12 shown in FIG. 1. Method 200 proceeds to 212 after intake temperature is determined.

At 212, method 200 determines a ratio of gaseous fuel to air in the engine intake. In one example, the ratio of gaseous fuel to air is adjusted to provide a stoichiometric mixture for combustion at a value of 17.2:1. A richer or leaner ratio may be provided by adding or subtracting fuel to the engine. The fuel amount may be adjusted by reducing or increasing a fuel pulse width of a gaseous fuel injector. Method 200 proceeds to 214 after the ratio of gaseous fuel to air is determined.

At 214, method 200 determines a specific heat of the combined air and gaseous fuel mixture. In one example, the specific heat of the combined mixture at a constant volume is determined via the equation:

$$\text{Eff\_Cvo} = \left(\frac{1}{1+17.2}\right) \cdot \text{Cvo\_methane} + \left(\frac{17.2}{1+17.2}\right) \cdot \text{Cvo\_air}$$

Where Eff_Cvo is the initial effective Cvo for the mixture of air and fuel, 17.2 is the ratio of gaseous fuel to air, Cvo_methane is the specific heat at constant volume of methane (e.g. 1.7354 kJ/kgK), and Cvo_air is the specific heat at constant volume of air (e.g. 0.165 kJ/kgK). Method 200 proceeds to 215 after the specific heat of the gaseous fuel and air mixture is determined.

At 216, the temperature of the combined gaseous fuel and air mixture is determined. The combined temperature reflects how injecting the gaseous fuel cools the temperature of air inducted to the engine. In one example, method 200 determines the combined gaseous fuel and air mixture temperature according to the following equation:

Eff_mct·Eff_Cvo=1/1+17.2·IFT·Cvo_methane+1/1+
17.2·MCT·Cvo_air

Where Eff_mct is the effective manifold charge temperature, IFT is the injected fuel temperature, MCT is the manifold charge temperature, and the remaining variables are as previously described. Method 200 proceeds to 218 after the effective manifold charge temperature is determined.

At 218, method 200 determines cylinder air charge via the combined fuel-air mixture temperature or the effective manifold charge temperature from 216. In one example, the cylinder air charge is determined from the ideal gas law PV=nRT where T is the effective manifold charge temperature in degrees K, P is pressure in the intake manifold as determined at 206, V is cylinder volume, n is a number of moles of air, and R is a gas constant. Alternatively, cylinder air charge may be determined via a mass air sensor and adjusted for the air charge temperature as is described in U.S. Pat. No. 5,331,936 which is hereby fully incorporated by reference for all intents and purposes. Method 200 proceeds to 220 after the cylinder air charge is adjusted.

At 220, method 200 adjusts a throttle position to adjust the estimated cylinder air charge from 218 to a desired cylinder air charge. The desired cylinder air charge may be empirically determined and stored in memory that is indexed via engine speed and engine torque demand. If the estimated cylinder air charge is less than the desired cylinder air charge, the throttle opening amount is increased. If the estimated cylinder air charge is greater than the desired cylinder air charge, the throttle opening amount is decreased. The throttle position is adjusted so that cylinder air charge is adjusted for a subsequent cylinder cycle. Method 200 proceeds to 222 after the throttle is adjusted to provide the desired cylinder air charge (e.g., the amount of air in a cylinder that is combusted with the fuel during a cylinder cycle).

At 222, method 200 adjusts cylinder spark timing. The spark timing may be adjusted for the present cylinder cycle so that the spark advance is proper given the cylinder air charge as determined at 218 using the effective manifold charge temperature. In one example, spark timing is empirically determined and stored in a table that is indexed via engine speed and requested torque. Output from the table is adjusted based on air intake temperature, and in particular, effective manifold charge temperature. For example, if effective manifold charge temperature is less than temperature measured in the intake manifold, spark may be advanced. Method 200 proceeds to 224 after cylinder spark timing is adjusted.

At 224, method 200 adjusts timing of the injected gaseous fuel. The amount of injected gaseous fuel may be varied about stoichiometric conditions for an air-methane mixture (e.g., 17.2:1) to improve catalyst efficiency. However, if the cylinder air charge is greater than desired because the injected fuel amount cools the cylinder air charge, the amount of fuel injected to the engine may be reduced to account for at least part of the difference in cylinder air charge. However, the throttle may be adjusted with greater authority so that the desired air-fuel ratio may be maintained. Method 200 proceeds to 226 for systems that include injection of gaseous fuels and liquid fuels. Otherwise, method 200 proceeds to exit when liquid fuel is not injected to the engine.

At 226, method 200 adjusts the amount of liquid fuel injected to the engine. If the cylinder air charge based on the effective manifold temperature is greater than expected, the amount of liquid fuel injected to the engine may be increased to provide a stoichiometric air-fuel mixture to the engine cylinders. If the cylinder air charge based on the effective manifold temperature is less than expected, the amount of liquid fuel injected to the engine may be decreased to provide a stoichiometric air-fuel mixture to engine cylinders. In one example, the amount of liquid fuel injected to engine cylinders is adjusted proportionately to the difference between the desired cylinder charge and the cylinder charge estimated via the effective manifold temperature. Method 200 proceeds to exit after the timing of liquid fuel injection is adjusted.

Thus, the method of FIG. 2 provides for a method for operating an engine, comprising: adjusting an amount of air inducted into an engine in response to output of a temperature sensor in an engine air intake; and adjusting the amount of air inducted into the engine in response to a temperature of a gaseous fuel after expansion of the gaseous fuel, the temperature of the gaseous fuel not responsive to the temperature sensor in the air stream. In other words, cylinder air charge is adjusted to account for injection of gaseous fuel without the compensation derived from injection of the gaseous fuel being adjusted responsive to a temperature of air, or of air and EGR.

In some examples, the method includes where the gaseous fuel is methane, and where the air intake is a cylinder intake port. The method also includes where the gaseous fuel is methane, and where the air intake is an intake manifold located downstream of a throttle. The method includes where accounting for gaseous fuel expansion includes accounting for a cooling effect that increases a density of the air inducted into the engine. The method includes where accounting for the cooling effect includes determining fuel temperature based on isentropic expansion. The method further comprises injecting liquid fuel to an engine cylinder during an engine cycle when the gaseous fuel is injected. The method includes where the liquid fuel is gasoline and where the amount of gasoline injected is adjusted in response to the temperature of the gaseous fuel and air mixture.

In another example, the method of FIG. 2 provides for operating an engine, comprising: adjusting a cylinder air charge in response to a temperature of air inducted to an engine and a resultant temperature of a gaseous fuel injected into an engine air intake, the resultant temperature being a temperature not based on the temperature of air. The method includes where the resultant temperature is a temperature after the gaseous fuel expands in the engine air intake. The method includes where the resultant temperature is based on isentropic expansion of the gaseous fuel. The method includes where the cylinder air charge is adjusted in response to a resultant intake charge temperature that is based on the temperature of air inducted to the engine and the resultant temperature of the gaseous fuel.

In some examples, the method further comprises adjusting spark timing in response to the resultant intake charge temperature. The method further comprises adjusting an amount of the gaseous fuel injected to the engine in response to the cylinder air charge. The method also includes where the cylinder air charge is adjusted via a throttle.

In yet another example, the method of FIG. 2 provides for operating an engine, comprising: supplying a first ratio of a gaseous fuel and air to a cylinder during a first condition; supplying a second ratio of the gaseous fuel and air to the cylinder during a second condition; adjusting a cylinder air charge during the first condition responsive to the first ratio; and adjusting the cylinder air charge during the second condition responsive to the second ratio. In other words, since the cooling effect of injecting gaseous fuel to the engine is directly based on the amount of gaseous fuel injected, the cylinder air charge is adjusted responsive to the amount of gaseous fuel injected and the amount of cooling it provides to the fuel and air mixture.

The method includes where during the first condition the first ratio of gaseous fuel to air is greater than the ratio of gaseous fuel to air in during the second condition, and where the cylinder air charge during the first condition is adjusted by a larger percentage than the cylinder air charge during the second condition. The method also includes where the cylinder air charge during the first condition is adjusted responsive to a resultant gaseous fuel temperature that is not based on air temperature. The method includes where the cylinder air charge is also adjusted during the first condition responsive to a resultant temperature of an amount of gaseous fuel injected and a temperature of air entering the engine during the first condition. The method also includes where during the first condition, an estimated temperature of a mixture of the gaseous fuel and air is based on the first ratio. The method also includes where during the first condition, the cylinder air charge is adjusted via a throttle.

As will be appreciated by one of ordinary skill in the art, the method described in FIG. 2 may represent one or more of any number of processing strategies such as event-driven, interrupt-driven, multi-tasking, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
   determining a temperature of air entering the engine;
   determining a temperature of a gaseous fuel injected to the engine, the temperature of the gaseous fuel based on engine intake manifold pressure, on a calculation that does not include air temperature, and being a temperature of the gaseous fuel after it has expanded in an engine air intake; and
   adjusting a cylinder air charge via an electronic controller in response to the temperature of air entering the engine and the temperature of the gaseous fuel injected into the engine.

2. The method of claim 1, where the cylinder air charge is adjusted in response to an air-fuel mixture temperature that is based on the temperature of air entering the engine and the temperature of the gaseous fuel.

3. The method of claim 2, further comprising adjusting spark timing in response to the air-fuel mixture temperature.

4. The method of claim 1, further comprising adjusting an amount of the gaseous fuel injected to the engine air intake in response to the cylinder air charge, and further comprising determining a temperature of a mixture of the air entering the engine and gaseous fuel based on a specific heat of the mixture.

5. The method of claim 1, where the cylinder air charge is adjusted via a throttle, and further comprising determining a specific heat of an air-fuel mixture based on a ratio of fuel to air in the engine air intake, and determining a temperature of the air-fuel mixture from the specific heat of the air-fuel mixture.

6. The method of claim 1, where the gaseous fuel is methane, and where the engine air intake is an intake manifold located downstream of a throttle.

7. The method of claim 1, further comprising injecting a liquid fuel to an engine cylinder during an engine cycle when the gaseous fuel is injected.

8. The method of claim 7, where the liquid fuel is gasoline and where an amount of gasoline injected to the engine is adjusted in response to the temperature of the gaseous fuel and a temperature of an air mixture.

9. The method of claim 1, further comprising injecting liquid fuel to the engine, an amount of liquid fuel injected to the engine proportionate to a difference between a desired cylinder charge and a cylinder charge estimated from the temperature of the gaseous fuel.

10. The method of claim 1, where the gaseous fuel is methane, and where the engine air intake includes a cylinder intake port.

11. A method for operating an engine, comprising:
  determining a temperature of air entering the engine;
  determining a temperature of a gaseous fuel injected to the engine, the temperature of the gaseous fuel based on a ratio of engine intake manifold pressure to fuel rail pressure and being a temperature of the gaseous fuel after it has expanded in an engine air intake and based on a calculation that does not include air temperature; and
  adjusting a cylinder air charge via an electronic controller in response to the temperature of air entering the engine and the temperature of the gaseous fuel injected into the engine.

\* \* \* \* \*